United States Patent
Buck et al.

(10) Patent No.: US 6,456,153 B2
(45) Date of Patent: Sep. 24, 2002

(54) METHOD AND APPARATUS FOR A REGULATED POWER SUPPLY INCLUDING A CHARGE PUMP WITH SAMPLED FEEDBACK

(75) Inventors: Paul E. Buck, Tecumseh, MI (US); Karl H. Jacobs, Torrington, CT (US); Barry J. Male, West Granby, CT (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/849,323

(22) Filed: May 4, 2001

Related U.S. Application Data
(60) Provisional application No. 60/201,992, filed on May 4, 2000.

(51) Int. Cl.[7] .............................................. G05F 1/10
(52) U.S. Cl. ...................................................... 327/536
(58) Field of Search ................................. 327/530, 534, 327/535, 536, 537

(56) References Cited

U.S. PATENT DOCUMENTS

| | | | |
|---|---|---|---|
| 4,223,238 A | 9/1980 | Parkinson et al. | 307/297 |
| 4,291,366 A | 9/1981 | Nelson | 363/17 |
| 4,433,253 A | 2/1984 | Zapisek | 307/297 |
| 5,039,877 A | 8/1991 | Chern | 307/296.2 |
| 5,202,587 A | 4/1993 | McLaury | 307/296.2 |
| 5,563,779 A | 10/1996 | Cave et al. | 363/59 |
| 5,812,017 A * | 9/1998 | Golla et al. | 327/536 |
| 5,838,189 A | 11/1998 | Jeon | 327/537 |
| 5,946,258 A * | 8/1999 | Evertt et al. | 327/536 |
| 6,229,385 B1 * | 5/2001 | Bell et al. | 327/536 |
| 6,259,612 B1 * | 7/2001 | Itoh | 327/536 |

* cited by examiner

Primary Examiner—Jeffrey Zweizig
(74) Attorney, Agent, or Firm—April M. Mosby; W. James Brady; Frederick J. Telecky, Jr.

(57) ABSTRACT

A regulated integrated circuit power supply (200) intermittently applies feedback to a charge pump (202) on a sampled basis such that a feedback circuit (204) is enabled to sense the bias voltage ($V_{out}$) at predetermined intervals of time. Based upon the value of the bias voltage ($V_{out}$) as compared to a threshold voltage ($V_T$), the charge pump (202) is enabled to supply a voltage to the integrated circuit. Thereby, the regulated charge pump (202) does not overload the integrated circuit coupled thereto. The regulated integrated circuit power supply (200) includes the charge pump (202) coupled to the integrated circuit to supply bias voltage ($V_{out}$). Additionally, coupled to the integrated circuit, the feedback circuit (204) senses the bias voltage ($V_{out}$) and provides an output signal based upon a comparison between the bias voltage ($V_{out}$) and a voltage threshold ($V_T$) A switch (208) connected to the feedback circuit (204) selectively enables and disables sensing of the bias voltage ($V_{out}$). A signal generator (210) provides at least one output signal. A controller (212) receives both output signals from the signal generator (210) and the feedback circuit (204) to provide a first and a second control signal ($V_A$, $V_B$). The first control signal ($V_A$), responsive to the output signal of the signal generator (210), enables and disables the switch (208) at predetermined intervals. The second control signal ($V_B$), however, responsive to both output signals, enables and disables the charge pump (202). Thus, since the bias voltage ($V_{out}$) is measured intermittently at predetermined intervals, the regulated integrated circuit power supply (200) does not unnecessarily load the integrated circuit nor increase power consumption.

10 Claims, 2 Drawing Sheets

METHOD AND APPARATUS FOR A REGULATED POWER SUPPLY INCLUDING A CHARGE PUMP WITH SAMPLED FEEDBACK

This application claims the benefit of provisional application Ser. No. 60/201,992, files May 4, 2000.

FIELD OF THE INVENTION

This invention relates generally to the field of electrical supplies; and, in particular, to a charge pump circuit for avoiding excessive discharge of the current available at the output.

BACKGROUND OF THE INVENTION

Low voltage integrated circuitry has steadily improved over the years. Presently, low voltage integrated circuit devices commonly operate in the two to three volt range. Low voltage operation provides, among other benefits, low power consumption. Thus, in battery operated devices, such as portable telephones, pagers, lap-top computers, hot swap devices and the like, low voltage integrated circuitry allows the devices to operate proportionally longer than devices operating at higher voltages.

Low voltage operation, while providing many benefits, causes problems with respect to some of the circuitry contained in the integrated circuit. Field effect transistors, which are commonly used for switching, require minimum gating voltages to operate in favorable ranges.

Thus, in many regulated power supplies, charge pumps are used to amplify voltages. Charge pumps, supplied by a source voltage $V_{DD}$, operate in a two-stage switched mode to provide an amplified voltage at an output. In a first phase of the charge pump's operation, a capacitor is charged with a source voltage to the level of the source voltage. Then, on a second phase of the charge pump's operation, the circuit is switched such that the source voltage and capacitor are connected in series to an output so as to create an amplified voltage at the output. The charge pump is capable of providing as much as twice the source voltage $V_{DD}$ at the output. Charge pumps may be employed as power supplies by driving output capacitors.

While the charge pump provides an increased voltage, the supplied voltage level varies depending on load variations and battery supply variations. When the load is relatively large and the battery supply is relatively low, the charge pump supplied voltage will be low and thus exhibiting the same problems as mentioned above. In contrast, when the load is relatively small the battery supply is relatively large, the charge pump supplied voltage may be too large, which can destroy oxide layers and otherwise reduce the lifecycle of the integrated circuit elements. Thus, regulating the output voltage of the charge pumps is important.

A known method of regulating the output voltage of a charge pump includes stacking diodes at the output of the charge pump to prevent the output voltage from exceeding a maximum voltage. When the output voltage of the charge pump reaches the turn-on voltage of the diode stack, current flows through the diode stack to ground. In low power applications, any current drain is undesirable. Therefore, while this technique prevents over-voltage conditions, it has the very undesirable side effect of increased power consumption and does not regulate the charge pump voltage for under-voltage conditions.

Another known method of regulating output voltage is disclosed in U.S. Pat. No. 4,223,238 which is incorporated by reference herein An oscillator provides true and complement oscillating output signals to a pair of conductors which are coupled to a charge pump for actively driving the charge pump. The output of the charge pump is coupled to an integrated circuit substrate for pumping charge into the integrated circuit substrate. A feedback circuit is coupled to the substrate as well for sensing the substrate bias voltage and for providing a control signal to a control input of the oscillator. When the magnitude of the substrate bias voltage exceeds a desired limit, the control signal output is switched so as to disable the oscillator. The true and complement outputs provided by the oscillator then assume a predetermined voltage such that the charge pump is no longer actively driven. The magnitude of the substrate bias voltage then decreases until the feedback circuit again enables the oscillator. This procedure is repeated periodically so as to maintain the substrate bias voltage at a desired point. A common implementation of the feedback circuit comprises a voltage comparator having a first input coupled to a given threshold voltage and a second input coupled across a voltage divider circuit connected to the integrated circuit substrate to sense the substrate bias voltage. The resistive or capacitive elements, however,. used to implement the voltage divider, increase the load seen at the output terminal of the regulated integrated circuit power supply, creating an undesirable effect of increasing power consumption.

Thus, a need exists for a regulated charge pump that does not increase power consumption.

SUMMARY OF THE INVENTION

A regulated integrated circuit power supply in accordance with the invention intermittently applies feedback to a charge pump on a sampled basis such that the charge pump is enabled to supply a voltage to an integrated circuit. Thereby, the regulated charge pump does not overload the integrated circuit coupled thereto. The regulated integrated circuit power supply includes a charge pump coupled to the integrated circuit to supply bias voltage. A feedback circuit senses the bias voltage and provides an output control signal based upon a comparison between the bias voltage and a voltage threshold. A switch connected to the feedback circuit selectively enables and disables sensing of the bias voltage. A signal generator provides at least one output signal. A controller receives both output signals from the signal generator and the feedback circuit to provide a first and a second control signal. The first control signal, responsive to the output signal of the signal generator, enables and disables the switch at predetermined intervals. The second control signal, however, responsive to both output signals, enables and disables the charge pump. Thus, since the substrate bias voltage is measured intermittently at predetermined intervals, the regulated integrated circuit power supply does not unnecessarily load the integrated circuit nor increase power consumption. A second embodiment may include a means for providing hysteresis.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

Figure 1:
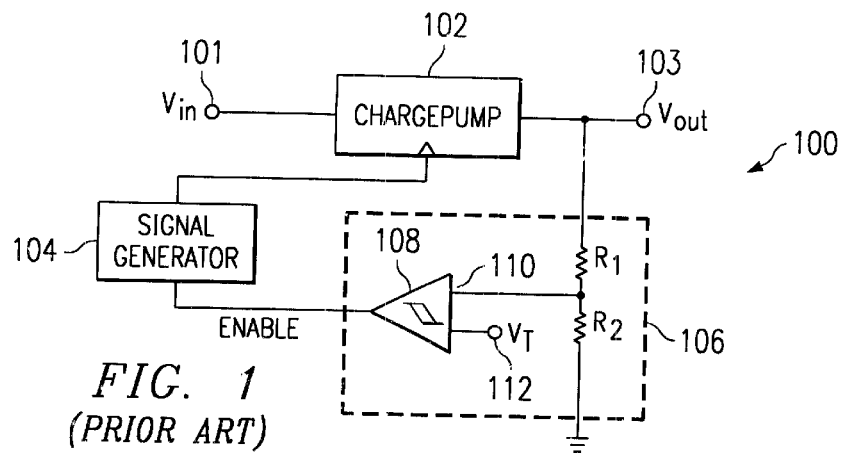
FIG. 1 is a schematic of a known regulated integrated circuit power supply.

The present invention can be better understood by comparison with a known regulated integrated circuit power supply 100 as shown in FIG. 1. A charge pump 102 couples to receive a voltage input signal $V_{in}$ through an input terminal 101. A feedback circuit 106 is connected to the output terminal 103 for sensing the substrate bias voltage, $V_{out}$. The feedback circuit 106 compares the substrate bias voltage, $V_{out}$, with a voltage threshold, $V_T$, supplied at input node 112 of comparator 108. Comparator 108 couples across voltage divider circuit including resistors $R_1$ and $R_2$ to sense the substrate bias voltage applied across resistor $R_2$. Comparator 108 provides an output signal which enables and disables a signal generator 104. As a result, signal generator 104 sends an enabling and disabling signal to the charge pump 102 to drive more charge to output terminal 103. The resistors, $R_1$ and $R_2$, however, used to implement the voltage divider, increase the load seen at output terminal 103, creating an undesirable effect of increasing power consumption.

Figure 2:
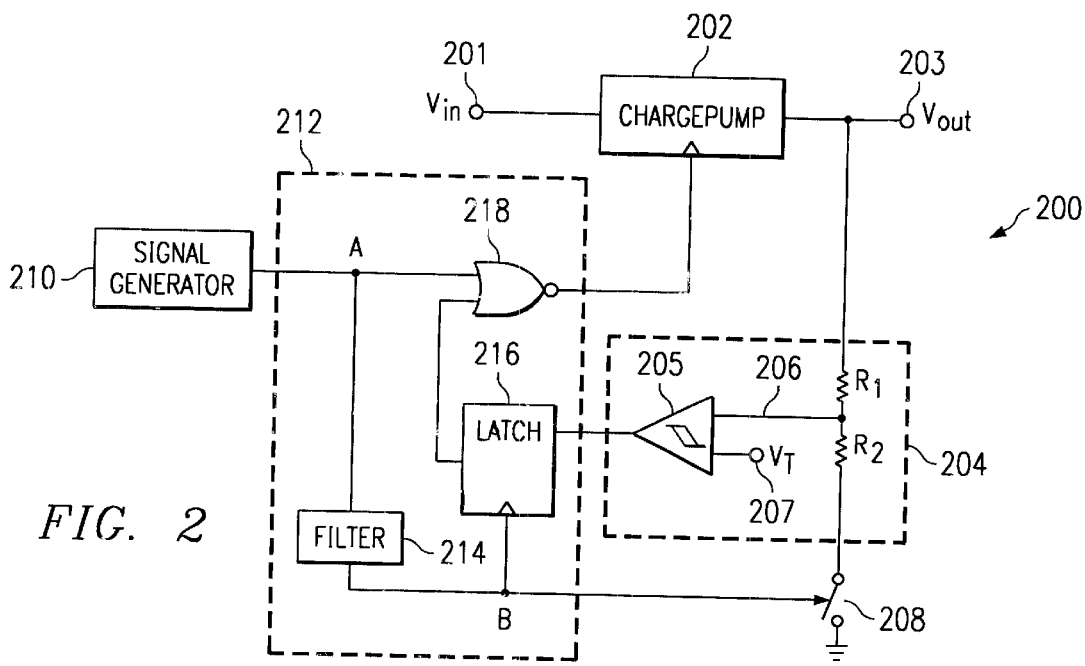
FIG. 2 is a schematic of a regulated integrated circuit power supply in accordance with the present invention.

FIG. 2 illustrates a regulated integrated circuit power supply 200 in accordance with the present invention that diminishes the effect of an increased load seen at an output terminal 203 due to the voltage divider circuit as described above. A charge pump 202 couples to receive a voltage input signal $V_{in}$ through an input terminal 201. A feedback circuit 204 is connected to the output terminal 203 for sensing the bias voltage, $V_{out}$. A switch 208 is coupled to feedback circuit 204 to enable and disable the sensing of the bias voltage, $V_{out}$. Controller 212 is coupled to receive output signals from feedback circuit 204 and a signal generator 210. Controller 212 generates a first control signal which enables and disables switch 208 at predetermined intervals. Controller 212, also, generates a second control signal which enables and disables charge pump 202 based upon the output signals from both the signal generator 210 and the feedback circuit 204.

In greater detail, feedback circuit 204 compares the bias voltage, $V_{out}$, with a voltage threshold $V_T$ supplied at input node 207 of comparator 205. Input 206 of comparator 205 couples across a voltage divider circuit including resistors $R_1$ and $R_2$ to sense the substrate bias voltage, $V_{out}$, applied across resistor $R_2$. Comparator 205 provides an control signal for enabling and disabling the output signal generated by the signal generator 210. The control signal from comparator 205 is captured in latch 216. Latch 216 is clocked by the output of a filter 214 which couples to receive the output of signal generator 210. The output of filter 214 is used as the first control signal of the controller 212 which operably couples to switch 208 for enabling and disabling sensing of the bias voltage, $V_{out}$. The output signal of latch 216 and signal generator 210 couple to the inputs of NOR gate 218, the output of which enables and disables charge pump 202. As a result, when charge pump 202 is enabled, more charge is driven to output terminal 203. Thus, the load supplied due to the voltage divider circuit including resistors, $R_1$ and $R_2$, are only applied at predetermined intervals based upon the filtering of filter 214. Accordingly, the power consumption of the power supply 200 is less than the known power supply 100.

Figure 3:
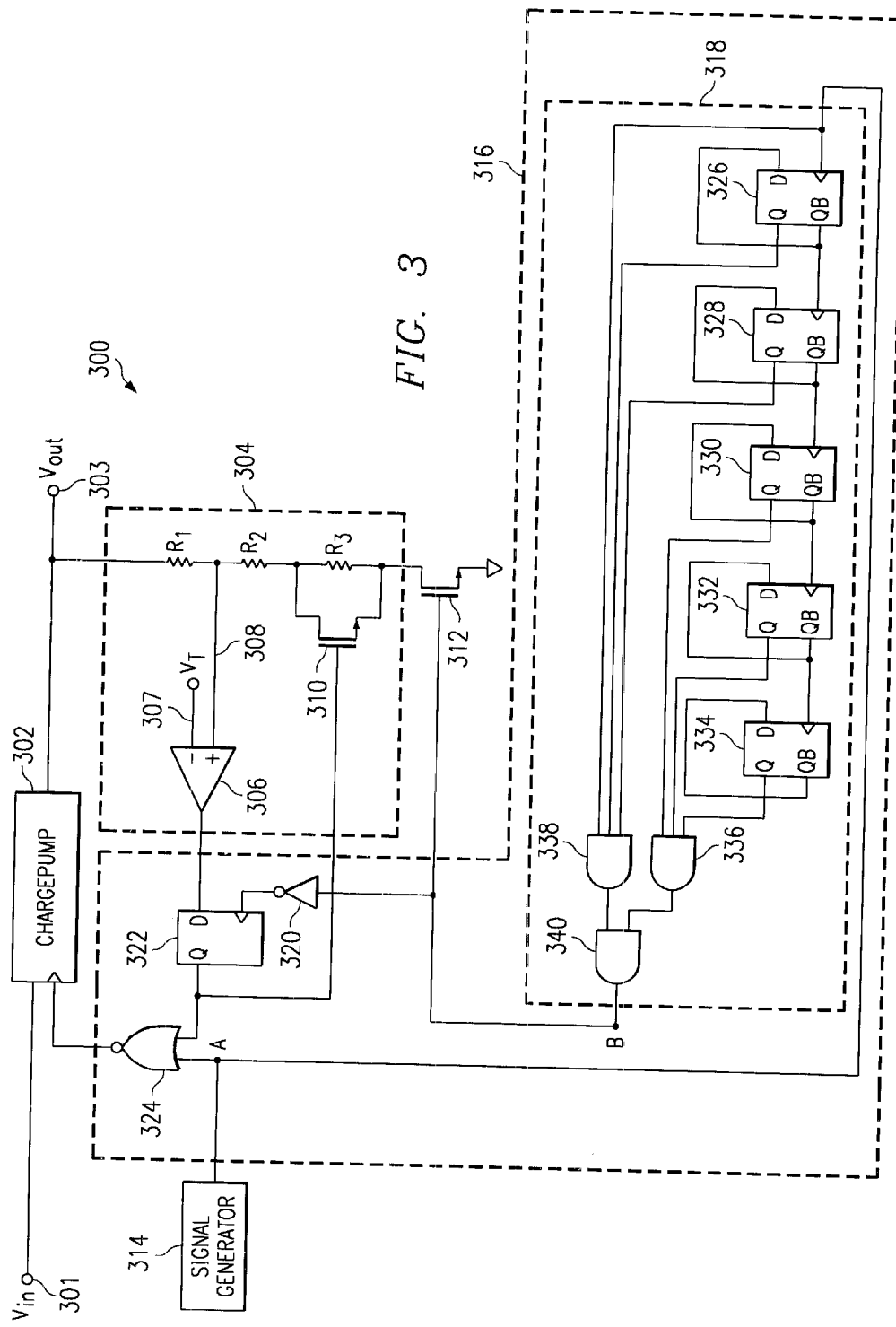
FIG. 3 is a schematic of a second embodiment of a regulated integrated circuit power supply in accordance with the present invention.

A second embodiment of a regulated integrated circuit power supply 300 in accordance with the present invention is displayed in FIG. 3. Similar to the previous embodiment, a charge pump 302, which drives charge to an output terminal 303, couples to receive a voltage input signal $V_{in}$ through an input terminal 301. A feedback circuit 304 is connected to the output terminal 303 for sensing the bias voltage, $V_{out}$. A switch 312 is coupled to feedback circuit 304 to enable and disable the sensing of the bias voltage, $V_{out}$. A signal generator 314 is connected to a controller 316. Controller 316 is coupled to receive output signals from feedback circuit 304 and signal generator 314. Controller 316 generates a first control signal which enables and disables switch 312 at predetermined intervals. Controller 316, also, generates a second control signal which enables and disables charge pump 302 based upon the output signals from both the signal generator 314 and the feedback circuit 304.

In greater detail, feedback circuit 304 compares the bias voltage, $V_{out}$, with a voltage threshold $V_T$ supplied at input node 307 of comparator 306. Input 308 of comparator 306 couples across a voltage divider circuit including resistors $R_1$, $R_2$, and $R_3$ to sense the bias voltage, $V_{out}$, applied across resistor $R_2$ and $R_3$. Comparator 306 provides an output signal for enabling and disabling the output signal generated by the signal generator 314. Signal generator 314 is connected to a filter 318. The output signal of comparator 306 is captured in latch 322. Latch 322 is clocked by the output of an inverter 320 that couples to receive the output signal of filter 318. A switch 310 couples across resistor $R_3$ to enable and disable the load $R_3$ applied at output terminal 303. An additional load, resistor $R_3$, is coupled to resistor $R_2$ to provide hysteresis. Switch 310 is enabled and disabled by the output of latch 322. Initially, feedback circuit 304 senses the bias voltage, $V_{out}$, applied across resistors $R_1$, $R_2$ and $R_3$. Once, however, the bias voltage, $V_{out}$, is detected to be greater than the threshold voltage, $V_T$, switch 310 is closed, shorting the load of resistor $R_3$ such that the feedback circuit 304 senses the bias voltage applied across resistor $R_1$ and $R_2$ solely.

Filter 316 includes a plurality of flip-flops, 326, 328, 330, 332, and 334, coupled to form a first serial shift register, including flip-flops, 326 and 328, coupled to a second serial shift register, including flip-flops, 330, 332, and 334, wherein the output of the signal generator 314 couples to the clock input of flip-flop 326. The output of the signal generator 314 and Q outputs of the first shift register, 326 and 328, couple to the inputs of an AND gate 338. The Q outputs of the first shift register, 330, 332, and 334, couple to the inputs of an AND gate 336. The outputs of AND gates 336 and 338 couple to a AND gate 340. The output of AND gate 340 couples to form the output node B of the filter 318.

More specifically, the output of the signal generator 314 couples to the clock input of flip-flop 326 and the first input of a AND gate 338. The D input of flip-flop 326 couples to its complemented Q output and the clock input of flip-flop 328. The Q output of flip-flop 326 couples to AND gate 338. The D input of flip-flop 328 couples to its complemented Q output and the clock input of flip-flop 330. The Q output of flip-flop 328 couples to AND gate 338. The D input of flip-flop 330 couples to its complemented Q output and the clock input of flip-flop 332. The Q output of flip-flop 330 couples to AND gate 336. The D input of flip-flop 332 couples to its complemented Q output and the clock input of flip-flop 334. The Q output of flip-flop 332 couples to AND gate 336. The D input of flip-flop 334 couples to its complemented Q output. The Q output of flip-flop 334 couples to AND gate 336.

The output of filter 318 is used as the first control signal of the controller 316 which operably couples to switch 312 for enabling and disabling sensing of the bias voltage, $V_{out}$. The output signal of latch 322 and signal generator 314 couple to the inputs of NOR gate 324, the output of which enables and disables charge pump 302. As a result, when charge pump 302 is enabled, more charge is driven to output terminal 303. Thus, the load supplied due to the voltage divider circuit including resistors, $R_1$, $R_2$, and $R_3$, are only applied at predetermined intervals based upon the filtering of filter 316. Accordingly, the power consumption of the power supply 300 is less than the known power supply 100.

Figure 4:
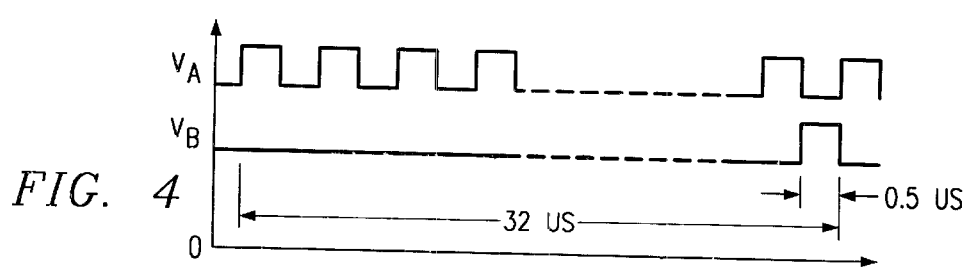
FIG. 4 is a graph of an output signal of the signal generator and the filter within the embodiment of the regulated integrated circuit power supply of FIG. 2.

FIG. 4 displays a timing diagram of the output signal, $V_A$, generated from the signal generator 314 and the output signal, $V_B$, generated from the filter 316. Operation of the regulation power supply in accordance with the invention intermittently applies feedback to a charge pump on a sampled basis. As shown in FIG. 4, the output from the signal generator 314, sampled once every 64 pulses such that the load from the voltage divider circuit, $R_1$, $R_2$ and $R_3$, is only sustained for a short period of time. One embodiment may include a signal generator 314 having a fixed input frequency at 1 MHz, wherein the frequency of the output signal from the signal generator 314 is decremented by filter 318. Since the output of the filter 318 controls the switch 312 to the voltage divider circuit including resistors, $R_1$, $R_2$ and $R_3$, when the switch 312 is closed, the comparator 306 compares the voltage across a portion of the voltage divider circuit with the threshold voltage $V_T$. The switch 312 is closed for half a microsecond for every 32 clock cycles.

Thus, in operation, when all the outputs of the flip-flops are active high along with the initial signal from the signal generator 314 is active high, the signal sample, generated by latch 322, goes active high every 32 cycles. This sample signal closes switch 310 across resistor $R_3$. Once closed, the voltage at the output of the regulated charge pump 302 is compared to the threshold voltage.

Those skilled in the art to which the invention relates will appreciate that various substitutions, modifications and additions can be made to the described embodiments, without departing from the spirit and scope of the invention as defined by the claims.

What is claimed is:

1. A regulated integrated circuit power supply having an input and an output terminal, the integrated circuit including a substrate, having a bias voltage, the integrated circuit coupled to the output terminal, an input voltage source coupled to the input terminal, the regulated integrated circuit power supply comprising:

a charge pump, having a control input, coupled between the input terminal and the output terminal;

a feedback circuit, having a control input, the feedback circuit operably coupled to the output terminal to sense the bias voltage at the output terminal, wherein the feedback circuit provides an output signal based upon a comparison between the bias voltage and a voltage threshold;

a switch, having a control input, the switch coupled between the control input of the feedback circuit and ground for selectively enabling and disabling the sensing of the bias voltage;

a signal generator for providing at least one output signal; and a controller coupled to receive the output signal of the signal generator and output signal of feedback circuit for providing a first and a second control signal, the first control signal responsive to the output signal of the signal generator to enable and disable the switch at predetermined intervals, the second control signal responsive to the plurality of output signals of the signal generator and the feedback circuit to enable and disable the charge pump for providing the bias voltage to the integrated circuit.

2. A regulated integrated circuit power supply as recited in claim 1, wherein the feedback circuit includes a voltage divider circuit coupled to a comparator for sensing the bias voltage applied across the voltage divider circuit and comparing the bias voltage applied across the voltage divider circuit to the threshold voltage.

3. A regulated integrated circuit power supply as recited in claim 2, wherein the voltage divider circuit comprises:

a first and second load coupled in series, wherein the comparator couples across the second load to sense the voltage applied across the second load.

4. A regulated integrated circuit power supply as recited in claim 3, wherein the first and second load are a first and second resistor.

5. A regulated integrated circuit power supply as recited in claim 3, wherein the first and second load are a first and second capacitor.

6. A regulated integrated circuit power supply recited in claim 1, wherein the switch is a transistor.

7. A regulated integrated circuit power supply recited in claim 1, wherein the signal generator is an oscillator.

8. A regulated integrated circuit power supply recited in claim 1, wherein the frequency of an output signal of the signal generator is 1 MHz.

9. A regulated integrated circuit power supply recited in claim 1, wherein the controller is a circuit having a first and second output comprising:

a filter coupled to receive the output signal of the signal generator to generate the first control signal;

a latch, having a control input, the latch coupled to receive the output signal of the feedback circuit, the control input of the latch coupled to the first control signal; and a NOR gate coupled to receive the output of the signal generator and the latched output signal of the feedback circuit to generate the second control signal.

10. A regulated integrated circuit power supply recited in claim 8, wherein the filter decreases the frequency of the output signal of the signal generator.

* * * * *